United States Patent [19]

Sugimoto et al.

[11] 4,372,859

[45] Feb. 8, 1983

[54] METHOD OF REMOVING MINUSCULE SOLID PARTICLES FROM LIQUID AND SYSTEM THEREFOR

[75] Inventors: Yoshikazu Sugimoto; Kiyotaka Shirosaki; Masashi Kawaguchi; Masaki Takeshima, all of Hitachi, Japan

[73] Assignees: Hitachi, Ltd.; Hitachi Kyowa Kogyo, Ltd., both of Tokyo, Japan

[21] Appl. No.: 176,201

[22] Filed: Aug. 7, 1980

[30] Foreign Application Priority Data

Aug. 10, 1979 [JP] Japan ............................ 54-101252

[51] Int. Cl.³ .............................................. B01D 23/24
[52] U.S. Cl. ................................... 210/739; 210/790; 210/794; 210/805; 210/105; 210/106; 210/137; 210/167; 210/323.2; 210/333.01; 210/434
[58] Field of Search ............... 210/790, 793, 794, 795, 210/805, 808, 137, 167, 266, 277, 287, 323.2, 333.01, 333.1, 345, 416.1, 433.1, 434, 446, 739, 106, 103, 105

[56] References Cited

U.S. PATENT DOCUMENTS

| | | | |
|---|---|---|---|
| 2,661,095 | 12/1953 | Koth | 210/433.1 |
| 3,313,621 | 4/1967 | Mott | 75/212 |
| 3,353,678 | 11/1967 | Dragon | 210/433.1 |
| 3,567,437 | 3/1971 | Mott | 75/214 |
| 3,741,892 | 6/1973 | Bourdale | 210/433.1 |
| 3,794,179 | 2/1974 | Doucet | 210/433.1 |

Primary Examiner—Ernest G. Therkorn
Attorney, Agent, or Firm—Craig and Antonelli

[57] ABSTRACT

A method of and a system for removing miniuscule solid particles from liquid wherein the liquid to be processed is supplied to one end of at least one filter element which may be a porous tube filter open at opposite ends and formed with a multiplicity of tiny openings in its wall having a first surface and a second surface. The liquid flows along the first surface and a portion thereof is passed through the tiny openings from the first surface side to the second surface side because of the latter being under lower pressure than the former, to be drawn off as filtrate. The rest of the liquid or a concentrated liquid portion flows out of the other end of the filter element. The flow velocity F of the liquid flowing along the first surface and/or the flow velocity f of the filtrate through the tiny openings is controlled such that the ratio F/f can be kept at a predetermined value.

23 Claims, 7 Drawing Figures

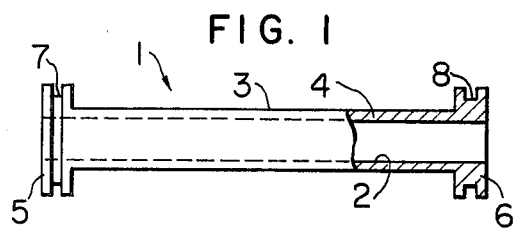
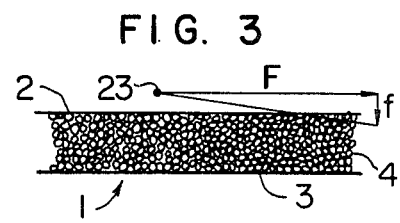
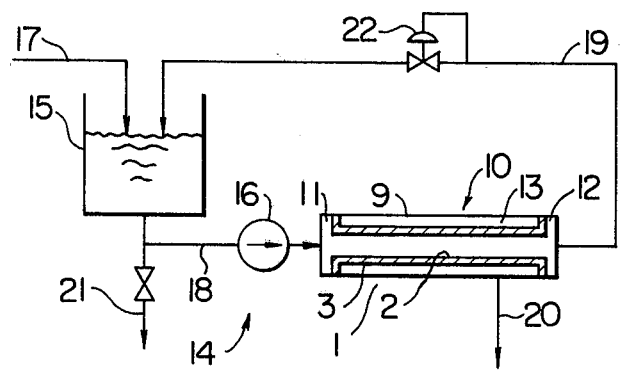
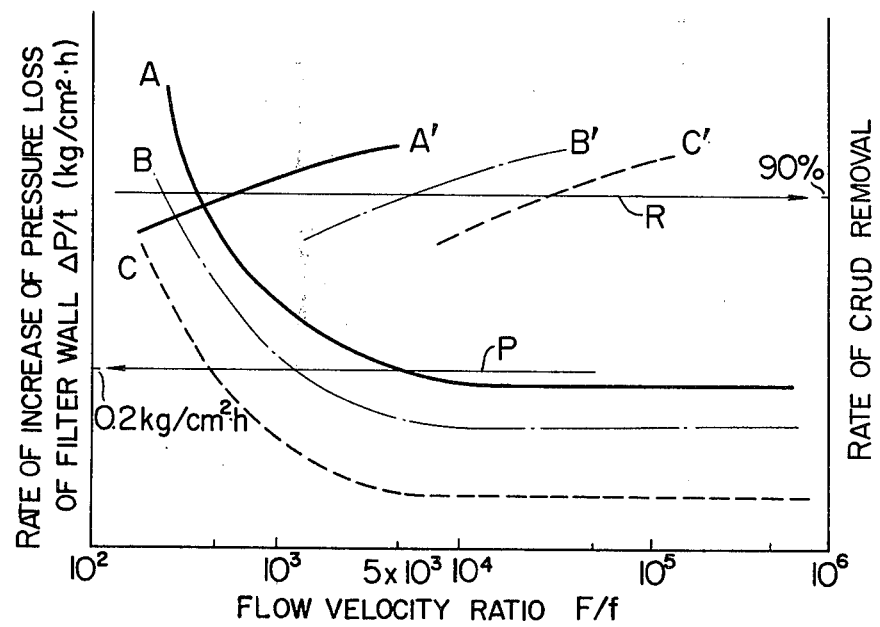

METHOD OF REMOVING MINUSCULE SOLID PARTICLES FROM LIQUID AND SYSTEM THEREFOR

BACKGROUND OF THE INVENTION

This invention relates in general to methods of and systems for removing minuscule solid particles from liquid, and more particularly it is concerned with a method of and a system for removing minuscule solid particles from liquid which are suitable for removing cruds (minuscule particulate material produced by corrosion) produced in the liquid handling piping of a nuclear power plant.

Heretofore, it has been customary to use filters of the type precoated with a filtering aid for removing cruds from radioactive waste liquid of a nuclear power plant. Some disadvantages are associated with this type of filters. They include: (1) inability to remove finer minuscule solid particles or cruds, (2) occurrence of obturation of the filters at early stages of use, and (3) an inordinately large proportion of the used filtering aid which is about ten times as high as the removed cruds. In a nuclear power plant, it is necessary that radioactive waste fluid be filtered and recovered for recycling as a cooling water for the core of the reactor. In the event that filters are not usable, removal of cruds should be carried out by using an evaporator unable to increase its processing capacity to the same level as the filters. This would increase running cost and the space required for installation. Moreover, pending final decisions on disposal of wastes from spent fuel, production of wastes at this time would make it necessary to increase spaces for storing such wastes in caskets and cost for solidifying the wastes. To obviate these problems, a demands for filters of improved performance has increased in recent years.

Generally, a porous tube filter is known which is produced by sintering metal powder and comprises a filter element composed of a tube made of metal and formed with tiny openings in its wall. Liquid to be processed is supplied to the porous tube filter, and filtered liquid or filtrate containing no solid particles flows out through the tiny openings to the outer surface of the porous tube filter. The idea of using a porous tube filter for removing cruds from waste liquid of a nuclear power plant has not hitherto been entertained.

SUMMARY OF THE INVENTION

An object of this invention is to provide a method of and a system for removing minuscule solid particles which is able to remove even finer minuscule particulate material and greatly reduce obturation of the filter and produces very little waste material.

Another object is to provide a method of and a system for removing minuscule solid particles from liquid using at least one filter element formed with a multiplicity of tiny openings in its wall which ensure less possibility of obturation of the filter element.

Still another object is to provide a method of and a system for processing radioactive waste liquid of a nuclear power plant containing minuscule solid particles, such as cruds, in which at least one filter element formed with a multiplicity of tiny openings in the wall is used for continuously processing the waste liquid.

According to the invention, there is provided a method of removing minuscule solid particles from liquid comprising the steps of supplying a liquid to be processed containing minuscule solid particles to one end of at least one filter element open at opposite ends and formed with a multiplicity of tiny openings in a wall including a first surface and a second surface, to allow the liquid to flow along the first surface; causing a portion of the liquid to flow through the tiny openings in the wall by reducing the pressure on the second surface of the wall of the filter element below the pressure on the first surface thereof, so that filtrate can be drawn off-out of the second surface of the wall; allowing the rest of the liquid to flow out of the filter element through the other end thereof, and controlling the flow velocity F of the liquid flowing along the first surface and/or the flow velocity f of the filtrate flowing through the tiny openings in the wall toward the second surface in such a manner that the ratio F/f can be kept at a predetermined value.

According to the invention, there is also provided a method of processing radioactive waste liquid for removing minuscule solid particles, such as cruds, from the waste liquid by passing the waste liquid through a plurality of filter elements each open at opposite ends and formed with a multiplicity of tiny openings in a wall including an inner surface and an outer surface, comprising the steps of receiving the waste liquid in a liquid recycling tank; continuously supplying the waste liquid from the liquid recycling tank to one end of each filter element and allowing same to flow along the inner surface of each filter element; causing a portion of the waste liquid to flow through the tiny openings in the wall by reducing the pressure on the outer surface of each filter element below the pressure on the inner surface thereof, so that filtrate can be continuously drawn off out of the outer surface; allowing the rest of the waste liquid or a concentrated waste liquid portion to flow out of the other end of each filter element and returning same to the liquid recycling tank; and controlling the flow velocity F of the waste liquid flowing along the inner surface of each filter element and/or the flow velocity f of the filtrate flowing through the tiny openings in the wall toward the outer surface in such a manner that the ratio F/f can be kept at a predetermined value.

According to the invention, there is also provided a system for removing minuscule solid particles from liquid comprising filter means comprising at least one filter element open at opposite ends and formed with a multiplicity of tiny openings in a wall including a first surface and a second surface, and an outer cylindrical member containing the filter element therein and defining an inlet plenum adjacent one end of the filter element, an outlet plenum adjacent the other end of the filter element and an inner plenum adjacent the second surface of the filter element and isolated from the inlet plenum and the outlet plenum; supply means for supplying the liquid to be processed containing minuscule solid particles to the inlet plenum of the filter means and causing same to flow along the first surface of the filter element; means for drawing off filtrate from the inner plenum after the filtrate has flowed through the tiny openings in the wall of the filter element into the inner plenum; means for allowing the rest of the liquid or a concentrated liquid portion to flow out of the outlet plenum; and control means for controlling the flow velocity F of the liquid flowing along the first surface and/or the flow velocity f of the filtrate flowing through the tiny openings in the wall into the inner plenum in such a manner that the ratio F/f can be kept at a predetermined value.

According to the invention, there is also provided a system for processing radioactive waste liquid of a nuclear power plant containing minuscule solid particles, such as cruds comprising: a liquid recycling tank for receiving the waste liquid; filter means including a plurality of filter elements each open at opposite ends and formed with a multiplicity of tiny openings in a wall including an inner surface and an outer surface, and an outer cylindrical member containing the plurality of filter elements therein and defining an inlet plenum adjacent one end of each filter element, an outlet plenum adjacent the other end of each filter element and an inner plenum adjacent the outer surface of each filter element and isolated from the inlet plenum and the outlet plenum; supply means for continuously supplying the waste liquid from the liquid recycling tank to the inlet plenum of the filter means and causing same to flow along the inner surface of each filter element; means for continuously drawing off filtrate from the inner plenum after the filtrate has flowed through the fine openings in the wall of each filter element into the inner plenum; means for allowing the rest of the waste liquid or a concentrated waste liquid portion to flow out of the outlet plenum; and control means for controlling the flow velocity F of the waste liquid flowing along the inner surface of each filter element and/or the flow velocity f of the filtrate flowing through the tiny openings in the wall into the inner plenum in such a manner that the ratio F/f can be kept at a predetermined value.

The flow velocity F of the processed liquid flowing along the first surface of a filter element as described in the specification is measured by dividing the flow rate of the liquid flowing through the filter element by the area of the flow channel of the processed liquid in the filter element and by further dividing the obtained value by time. In the case of a porous tube filter, the mean velocity F of the liquid flowing along the inner surface is measured by the following formula:

$$F \times time = \frac{\text{flow rate of liquid through one element}}{\pi/4 \times (\text{inner diameter of filter element})^2}$$

The mean velocity f of the filtrate flowing through the tiny openings in the walls of a filter element as described in the specification is measured by dividing the flow rate of the filtrate flowing out of the filter element by the surface area of the wall and by further dividing the obtained value by time. In the case of a porous tube filter, the mean velocity f of the filtrate flowing through the tiny openings in the wall is measured by the following formula:

$$f \times time = \frac{\text{flow rate of filtrate flowing out of one element}}{\pi \times \begin{pmatrix} \text{outer diameter} \\ \text{of element} \end{pmatrix} \times \begin{pmatrix} \text{length of} \\ \text{element} \end{pmatrix}}$$

BRIEF DESCRIPTION OF THE DRAWINGS

FIG. 1 is a fragmentary sectional view of a typical porous tube filter formed with a multiplicity of tiny openings;

FIG. 2 is a schematic view of one embodiment of the system according to the invention suitable for carrying into practice the method according to the invention for removing minuscule solid particles from a liquid by using a porous tube filter;

FIG. 3 is a view in explanation of the manner in which the processed liquid flowing through the filter element is filtered;

FIG. 4 is a diagram in which the abscissa represents the ratio F/f or the ratio of the flow velocity F of the processed liquid flowing through the filter element to the flow velocity f of the filtrate flowing through the tiny openings in the walls and the oridinate indicates on the left side the rate of increase in the pressure loss on the wall surfaces and on the right side the rate of removal of cruds, showing the results of experiments conducted on the changes in the rate of increase in the pressure loss on the wall surfaces and the rate of removal of cruds possibly caused by variations in the ratio F/f with three types of porous tube filter with the tiny openings of diameters $0.2\mu$, $0.5\mu$ and $2\mu$;

DESCRIPTION OF THE PREFERRED EMBODIMENT

Figure 5:
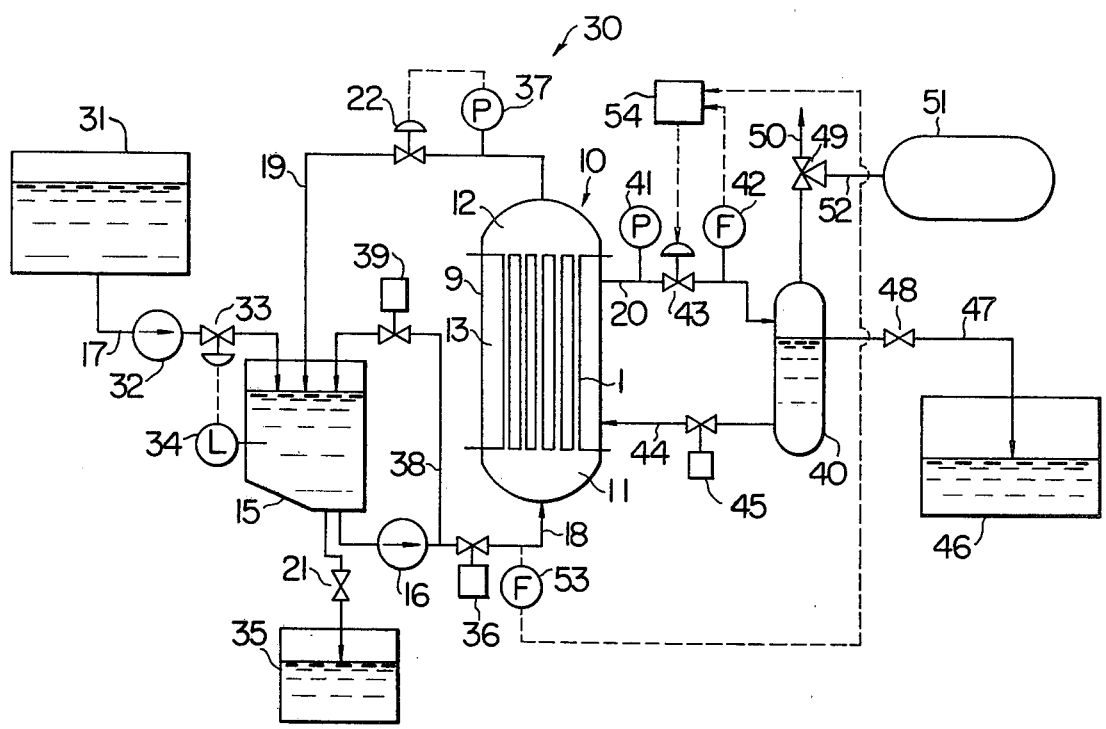
FIG. 5 is a schematic view of the system for removing minuscule solid particles shown in FIG. 2 as applied to processing of the waste liquid of a nuclear power plant.

Referring to FIG. 1, a filter element used in the method of removing minuscule solid particles from liquid and the system therefor according to the invention is generally designated by the numeral 1. The filter element 1 comprises a porous tube filter including a first surface or inner surface 2, a second surface or outer surface 3, and a wall 4 formed with a multiplicity of tiny openings or pores preferably having a circular crosssectional shape. The wall 4 has substantially the same thickness along the length of the filter element 1. The filter element 1 is made by sintering metal powder, such as SUS316 powder after same has been formed into a tube. The filter element 1 is formed at opposite ends with flanges 5 and 6 which are formed with O-ring grooves 7 and 8 respectively. The filter element 1 is not limited to the aforesaid specific form and may be of any construction so long as it is provided with a wall including a first surface and a second surface and formed with a multiplicity of tiny openings.

Referring to FIG. 2, the filter element 1 may be contained in an outer cylindrical member 9 to constitute filter means 10 comprising, in addition to the filter element 1, an inlet plenum 11 adjacent one end of the filter element 1, an outlet plenum 12 adjacent the other end of the filter element 1 and an inner plenum 13 adjacent the outer surface 3 of the filter element 1. The inner plenum 13 is hermtically sealed off or isolated from the inlet plenum 11 and the outlet plenum 12 by O-rings, not shown, fitted in the O-ring grooves 7 and 8 of the filter element 1.

FIG. 2 shows the solid particles removing system generally designated by the numeral 14 and comprising the aforesaid filter means 10. The system 14 further comprises a liquid recycling tank 15, a liquid recycling pump 16, a supply line 17 for supplying a liquid to be processed, a recycled liquid line 18, a return line 19, a filtrate draw-off line 20, a concentrated liquid discharge line 21 and a pressure control valve 22. The liquid to be processed supplied through the supply line 17 to the liquid recycling tank 15 has its pressure increased by the liquid recycling pump 16 before being passed through the recycled liquid line 18 to the inlet plenum 11 of the filter means 10, from which the liquid flows along the inner surface 2 of the filter element 1. The portion of the filter means 10 facing the outer surface 3 of the filter element 1 or the inner plenum 13 is maintained at a lower pressure than the portion of the filter means 10 defined by the inner surface 2 of the filter element 1 or the flow channel for the liquid. Thus solid particles or cruds contained in the liquid to be processed are separated from the liquid as the latter flows out through the multiplicity of tiny openings formed in the wall 4 of the filter element 1 into the inner plenum 13 as filtrate which is ejected from the system through the filtrate draw-off line 20. The liquid flowing through the flow channel is gradually concentrated as the filtrate flows through the tiny openings in the wall 4 into the inner plenum 13, so that the concentrated liquid portion is returned through the return line 20 and pressure control valve 22 to the liquid recycling tank 15. This process is repeated until the liquid in the liquid recycling tank 15 is concentrated to a predetermined level, when the concentrated liquid portion is ejected in a batch operation out of the processing system through the concentrated liquid discharge line 21.

The fine openings formed in the wall 4 of the filter element 1 may have a desired diameter by suitably selecting the grain size of the metal powder sintered into the porous tube filter. In the case of waste liquid of a nuclear power plant, solid particles or cruds contained therein have a grain size distribution of 1–10$\mu$. Thus the filter element used for processing the waste liquid of a nuclear power plant may have a multiplicity of tiny openings of a diameter in the range between 0.2 and 10$\mu$.

The manner in which the liquid to be processed is filtered through the tiny openings in the wall 4 of the filter element 1 will be described by referring to FIG. 3. In the figure, 23 designates cruds suspended in the liquid to be processed. Let us now discuss the forces exerted on the cruds 23. The clads 23 have acted thereon an axially oriented force commensurate with the flow velocity F of the liquid flowing along the inner surface 2 of the filter element 1, and a radially oriented force commensurate with the flow velocity f of the liquid flowing through the tiny openings in the wall 4 of the filter element 1 and drawn off as filtrate. As described hereinabove, the flow velocity F is represented by the flow rate of the liquid to be treated per unit sectional area of the flow channel for the liquid in the filter element 1, and the flow velocity f is represented by the flow rate of the filtrate per unit area of the outer surface 3 of the filter element 1.

Whether or not the cruds are introduced into the fine openings formed in the wall 4 depends on the ratio of F to f. More specifically, the larger the ratio F/f, the smaller would be the possibility of the cruds finding their way into the tiny openings in the wall 4. When the cruds are introduced into the tiny openings, some of them are trapped in and jam the tiny openings and cause obturation, while the rest of them flow through the tiny openings and are ejected from the processing system together with the filtrate. The cruds trapped in and obturating the tiny openings in the wall 4 cause an increase in the loss of pressure of the wall 4, and the cruds obturating the openings must be removed when the loss of pressure exceeds a limit. In view of the need to maintain the capacity factor of the processing system at a high level and to minimize maintenance of equipment, the frequency of removal of the cruds from the tiny openings in the wall 4 of the filter element 1 had better be minimized. Particularly when the processing method and system are applied to processing of radioactive waste liquid of a nuclear power plant, no practical purposes would be served unless the frequency of removal of the cruds obturating the filter means could be minimized. The frequency at which the trapped cruds are removed is expressed by the pressure loss increase rate of the wall 4. It has been ascertained that when the processing method is applied to the processing of radioactive waste liquid of a nuclear power plant, the processing method can be used in practical application if the pressure loss increase rate of the wall 4 of the filter means is over 0.2 kg/cm$^2$.h. It goes without saying that the solid particles ejected through the tiny openings in the wall 4 together with the filtrate are preferably minimized. It has also been ascertained that when the radioactive waste liquid of a nuclear power plant is processed, any method can serve practical purposes if the rate at which cruds are removed from the filtrate is over 90%.

FIG. 4 shows the results of experiments conducted on what changes variations in the ratio of the flow velocity F of the liquid to be treated to the flow velocity f of the filtrate would have on the pressure loss increase rate of the wall surfaces and the crud removing rate. In the experiments, a liquid simulating the waste liquid of a nuclear power plant was processed by the processing system shown in FIG. 2 by using three types of porous tube filters with the tiny openings of diameters of 0.2$\mu$, 0.5$\mu$ and 2$\mu$ formed in the walls, respectively. When processing was carried out by using a filter element with the tiny openings of a diameter of 0.2$\mu$, an increase in the ratio F/f caused the pressure loss increase rate to change as indicated by a curve A and the crud removing rate to change as indicated by a curve A'. When the tiny openings had a diameter of 0.5$\mu$, the pressure loss increase rate showed a change represented by a curve B and the crud removing rate showed a change indicated by a curve B'. With the tiny openings of a diameter of 2$\mu$, the pressure loss increase rate showed a change represented by a curve C and the crud removing rate showed a change indicated by a curve C'. A straight line P represents the critical value 0.2 kg/cm$^2$.h of the pressure loss increase rate and a straight line R represents the critical value 90% of the crud removing rate.

As can be seen in FIG. 4, when the filter element has a diameter of 0.2$\mu$ for the tiny openings in the wall of the filter element, a solid particle or crud removing rate$\geq$90% can be attained if the ratio F/f is$\geq$7$\times$10$^2$. However, to attain a pressure loss increase rate$\leq$0.2 kg/cm$^2$.h, the ratio F/f must be about$\geq$5$\times$10$^3$. Thus, the ratio F/f should after all be over about 5$\times$10$^3$. When the diameter is 0.5$\mu$, a pressure loss increase rate$\leq$0.2 kg/cm$^2$.h can be attained if the ratio F/f is about$\geq$2$\times$10$^3$. However, to attain a crud removing rate$\geq$90%, the ratio F/f must be about$\geq$5$\times$10$^3$. After all, the ratio F/f should be over about 5$\times$10$^3$. With a diameter of 2.0$\mu$, a pressure loss increase rate$\leq$0.2 kg/cm$^2$.h can be attained if the ratio F/f is about$\geq$5$\times$10$^2$. However, to attain a crud removing rate$\geq$90%, the ratio F/f must be about$\geq$2$\times$10$^4$. After all, the ratio F/f should be over about $2\times10^4$. An increase in the lower limit of the ratio F/f means that the liquid recycling pump 16 for supplying the liquid to be processed to the filter element 1 should have a large capacity. Thus the filter element with tiny openings of a diameter of $2.0\mu$ in its wall is economically more disadvantageous than the filter elements with a diameter of either 0.2 or $0.5\mu$.

From the results of the experiments discussed hereinabove, it has been discovered that when the pressure loss increase rate of the wall of the filter element and the solid particle removing rate have critical values in removing solid particles from liquid by using a filter element formed with a multiplicity of tiny openings in its wall, the operation is satisfactory if the ratio of the flow velocity F of the liquid to be treated to the flow velocity f of the filtrate is kept at a predetermined value.

From the results of the experiments discussed hereinabove, it has also been discovered that when the waste liquid of a nuclear power plant is processed by using a filter element formed with a multiplicity of tiny openings in its wall, the pressure loss increase rate of the wall of the filter element and the solid particle removing rate is maintained within their critical values thereby to enable the practical application of the process if the ratio of the flow velocity F of the liquid to be processed to the flow velocity f of the filtrate is kept at a predetermined value. It has also be discovered that the predetermined level is preferably over about $5\times10^3$.

It has also been found that the predetermined level of the ratio F/f is preferably over about $1\times10^4$ if it is desired to attain more satisfactory pressure loss increase and solid particle removing rates.

When the ratio F/f is too high, the processing system using a filter element of the type described would become unpractical because the liquid recycling pump 16 should have an inordinately large capacity, and the flow velocity F of the liquid through the filter element 1 would become too high, so that the inner surface 2 of the wall 4 would suffer from erosion. The results of experiments show that the ratio F/f is preferably below $1\times10^6$.

Based on the facts described hereinabove, the present invention proposes to control the flow velocity F of the liquid to be processed flowing through the filter element 1 along its inner surface 2 and/or the flow velocity f of the filtrate flowing through the tiny openings in the wall 4 of the filter element 1 toward the outer surface 3 in the processing system 14 shown in FIG. 2 in such a manner that the ratio F/f can be kept at a predetermined value, to continuously obtain a satisfactory pressure loss increase rate and a satisfactory solid particle removing rate. The predetermined value is over about $5\times10^3$ and more preferably in the range between $1\times10^4$ and $1\times10^6$.

Figure 6:
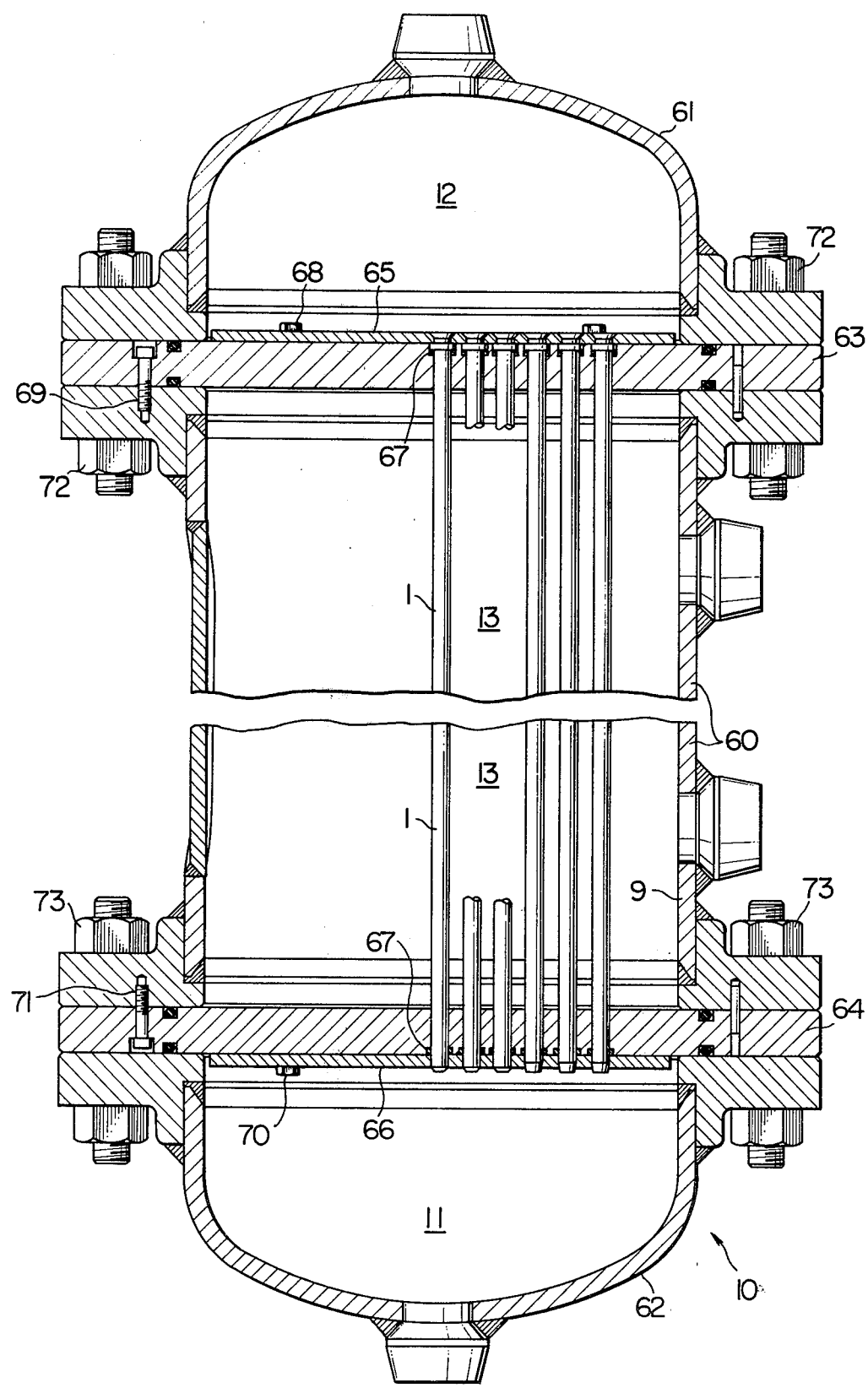
FIG. 6 is a sectional view, on an enlarged scale, of the filter means of the processing system shown in FIG. 5.

A preferred embodiments of the processing system incorporating therein the basic concept of the invention described hereinabove will be described by referring to FIGS. 5-7 wherein parts similar to those shown in FIG. 2 are designated by like reference characters.

The embodiment shown and described deals with the radioactive waste liquid of a nuclear power plant containing cruds. The processing system is generally designated by the numeral 30 and includes a tank 31 for receiving liquid to be processed which is connected to the liquid recycling tank 15 via the liquid supply line 17 having a supply pump 32 and a level control valve 33. The liquid recycling tank 15 is provided with a level meter 34, and the concentrated liquid discharge line 21 connects the liquid recycling tank 15 to a concentrated liquid tank 35. The recycled liquid line 18 having the liquid recycling pump 16, an on-off valve 36 and a flow meter 53 connects the liquid recycling tank 15 to the inlet plenum 11 of the filter means 10. The return line 19 connected at one end thereof to the outlet plenum 12 of the filter means 10 has a pressure gauge 37 and a pressure control valve 22 and is connected at the other end thereof to the liquid recycling tank 15. The outer cylindrical member 9 of the filter means 10 has mounted therein a plurality of filter elements 1, each filter element 1 connecting the inlet plenum 11 with the outlet plenum 12 of the filter means 10. A bypass line 38 connects the recycled liquid line 18 to the liquid recycling tank 15 and has an on-off valve 39.

The filtrate draw-off line 20 is connected at one end thereof to the inner plenum 13 defined between the outer cylindrical member 9 and the filter element 1 of the filter means 10 and at the other end thereof to a reverse cleaning water tank 40. A pressure gauge 41, a flow meter 42 and a flow rate control valve 43 are mounted in the filtrate draw-off line 20. The reverse cleaning water tank 40 is further connected to the inner plenum 13 via a reverse cleaning water injecting line 44 having an on-off valve 45. A filtrate tank 46 is connected to the reverse cleaning water tank 40 via a filtrate discharge line 47 having an on-off valve 48. The reverse cleaning water tank 40 has connected to its upper end portion a line 50 for mounting a three-way valve 49. A high-pressure air tank 51 is connected to the three-way valve 49 via a line 52.

The flow meters 42 and 53 are electrically connected to a controller 54 which in turn is electrically connected to the flow rate control valve 43. The controller 54 is supplied with flow rate signals Q and q from the flow meters 53 and 42 respectively, and calculates the flow velocities F and f and the ratio F/f from these flow rate signals. The controller 54 has stored therein the predetermined value of the ratio of the flow velocities F/f in the range between $5\times10^3$ and $1\times10^6$. Thus when the calculated flow velocity ratio F/f does not coincide with the predetermined value and deviates from the allowable range, the controller 54 generates a control signal which controls the flow rate control valve 43.

The filter means 10 will be described in detail by referring to FIG. 6. The outer cylindrical member 9 comprises a shell 60, an upper cover 61, a lower cover 62, an upper filter element support plate 63, a lower filter element support plate 64, an upper filter element keep plate 65 and a lower filter element keep plate 66.

The filter elements 1 are each inserted in the upper filter element support plate 63, held by the upper element keep plate 65 while being sealed by a packing 67 and bolted in place at 68. The filter elements 1, upper filter element support plate 63 and upper filter element keep plate 65 formed thus into a unitary structure are bolted to the shell 60 at 69. Then, the filter elements 1 are each inserted at the lower end portion in the lower filter element support plate 64, held by the lower filter element keep plate 66 while being sealed by the packing 67 and bolted in place at 70. The lower filter element support plate 64 and upper filter element support palte 66 formed into a unitary structure are bolted to the shell 60 at 71. The upper cover 61 and lower cover 62 are bolted at 72 and 73 respectively to the shell 60 having the filter elements 1 secured thereto as described hereinabove.

In operation, radioactive waste liquid of a boiling-water reactor containing radioactive cruds is led to the tank 31 for receiving the liquid to be processed. The liquid in the tank 31 is supplied by means of the supply pump 32 to the liquid recycling tank 15 via the supply line 18. The flow rate of the liquid to be processed supplied to the liquid recycling tank 15 is controlled in such a manner that the liquid level of the tank 15 is kept constant by operating the level control valve 33 by a signal from the level meter 34. The liquid in tank 15 is introduced by the action of the liquid recycling pump 16 into the filter elements 1 via the inlet plenum 11. The fluid portions of the liquid to be processed pass through the tiny openings formed in the walls 4 of the filter elements 1 as shown in FIG. 3, and flow into the inner plenum 13 as clean filtrate. Almost no cruds in the liquid to be treated flow into the inner plenum 13. The liquid in which the proportion of the cruds has increased is discharged into the outlet plenum 12 and returned to the liquid recycling tank 15 via the return line 19. The filtrate is led through the filtrate draw-off line 20 to the reverse washing water tank 40, from which the filtrate is finally led to the filtrate tank 46 via line 47.

The flow rate of the liquid to be treated supplied to the inlet plenum 11 is measured by the flow meter 53 which generates a flow rate signal Q transmitted to the controller 54. The flow rate of the filtrate drawn off from the inner plenum 13 is measured by the flow meter 42 which generates a flow rate signal q transmitted to the controller 54. The controller 54 calculates the flow velocity F of the liquid to be treated per unit cross-sectional area of the flow channel in each filter element 1 based on the flow rate signal Q, and the flow velocity f of the filtrate per unit area of the outer surface of each filter element based on the flow rate signal q. Then the ratio F/f is calculated. The calculated value of the ratio F/f is compared with the predetermined value of the ratio F/f in the range between $5 \times 10^3$ and $1 \times 10^6$ which is stored in the controller 54. Thus the flow rate control valve 43 is adjusted in accordance with the result of comparison of the calculated value of F/f with the stored value thereof, to optimize the flow rate of the filtrate by keeping the value of the calculated ratio of F/f within the range of value stored in the controller 54.

Obturation of the tiny openings in the walls 4 of the filter elements 1 by the cruds rarely occurs. However, as the operation progresses, the cruds find their way into the tiny openings little by little, thereby causing a rise in the pressure loss on the wall surfaces. When the pressure loss has reached a predetermined level, the pressure gauge 41 produces a signal for effecting reverse washing of the filter elements 1. This process will be described in some detail hereinafter.

When the pressure loss has reached the predetermined level, the supply of the liquid to be processed to the filter elements 1 is stopped by closing the on-off valve 36 and opening the on-off valve 39. At the same time, air under high pressure is injected into the upper portion of the reverse washing water tank 40 via the three-way valve 49 from the high pressure air tank 51, while the on-off valve 48 is closed and the on-off valve 45 is opened. As a result, the high pressure of air causes the filtrate in the inner plenum 13 to flow backwardly from the outer surfaces of the walls of the filter elements 1 into the interior of each filter element 1 through the tiny openings in the wall 4, and the filtrate is returned from the filter elements 1 to the liquid recycling tank 15 via the return line 19. By this reverse washing operation, the cruds blocking the tiny openings in the walls 4 are removed therefrom and the pressure loss of the walls 4 is restored to the initial value.

One example of the operation of the processing system shown in FIGS. 5 and 6 will be described. The filter elements 1 of the filter means 10 comprised purous tube filters each made by sintering powder of SUS316 and having an outer diameter of 12.9 mm, an inner diameter of 9.3 mm and a length of 2286 mm, with the fine openings having a diameter of $0.5\mu$. The flow velocity F of the liquid to be processed flowing through the filter elements 1 and the flow rate of the filtrate (flow rate per unit area of the outer surface of each element 5; $f \times 10^3$ l/m².h) at initial stages of operation were set at 7 m/s and 400 l/m².h respectively. Thus the ratio F/f was as follows:

$$F/f = \frac{7 \text{ (m/s)} \times 3600 \text{ (s/h)}}{400 \text{ (l/m}^2 \cdot \text{h)} \times 10^{-3} \text{ (m}^3\text{/l)}} = 6.3 \times 10^4$$

The controller 54 was set at a flow velocity ratio F/f of $6.3 \times 10^4$. A reverse washing operation was performed once every hour, with a quantity of used water per operation (a quantity per unit area of the outer surface of each filter element) of 35 l/m².

In the example described hereinabove, even finer minuscule cruds could be removed from the filtrate. Obturation of the tiny openings in the wall of each filter element rarely occured, so that the waste liquid could be processed substantially continuously with only one reverse washing operation being performed every one hour.

Figure 7:
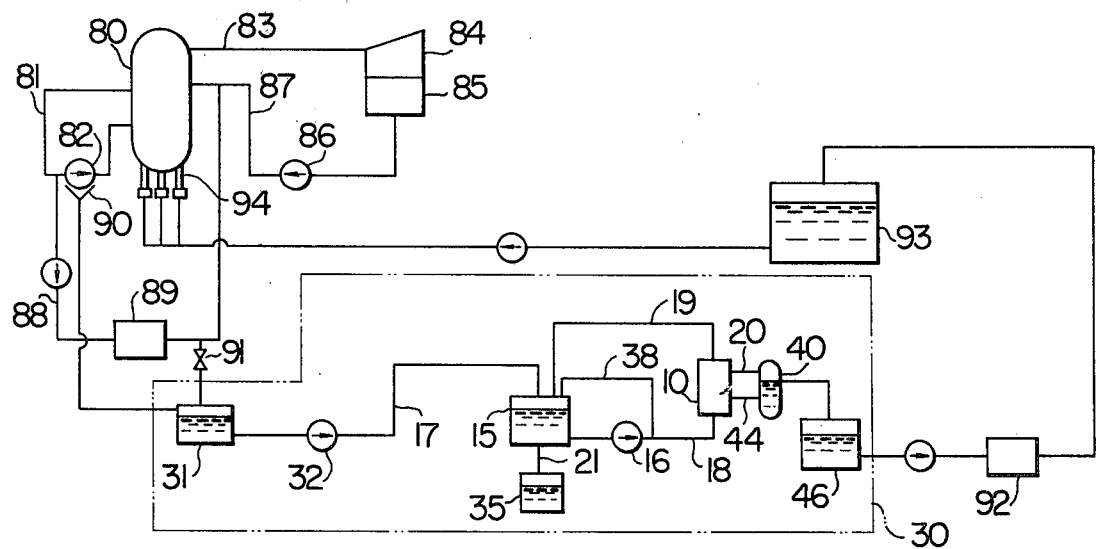
FIG. 7 is a schematic view of one example of the arrangement of the processing system shown in FIG. 6 in a nuclear power plant.

FIG. 7 shows one example of the arrangement of various components of the processing system as applied to a nuclear power plant. As shown, the processing system 30 is similar to that shown in FIG. 5 but part of the system 30 shown in FIG. 5 is omitted in the interest of brevity. The numeral 80 designates a reactor including a reactor core through which a cooling liquid or water is circulated by means of circulating pumps 82 mounted in a circulating line 81. Steam generated in the reactor core is led through a main steam line 83 to a turbine 84 and condensed into water in a condenser 85. The condensate is returned by a feedwater pump 87 to the reactor 80 via a feedwater line 87.

The cooling water flowing through the reactor core is cleaned at a filter-desalinator 89 to which the cooling water is passed through the circulating line 81 and a line 88 of the core cleaning system. The cleaned cooling water is supplied to the feedwater line 87.

Drain from the equipment of the primary system, such as the circulating pumps, etc., is collected through a drain receiver 90 in the liquid tank 31 for the liquid to be processed of the processing system 30. A valve 91 is opened when the cooling water in the reactor core 80 is withdrawn therefrom and passed to the tank 31 of the processing system 30. The filtrate collected in the filtrate tank 46 of the processing system 30 is passed through a desalinator 92 to a condensate storage tank 93 for storage therein. The cooling water in the condensate storage tank 93 is returned to the reactor core 80 via a control rod drive apparatus 94.

The processing system according to the invention has been described as being applied to processing of waste liquid of a nuclear power plant. It is to be understood, however, that the invention is not limited to this specific form of liquid and that any liquid, such as general industrial waste liquid, which may contain minuscule solid particles can be processed by the method and apparatus according to the invention for removing such solid particles therefrom.

What is claimed is:

1. A method of removing minuscule solid particles from liquid comprising:

supplying a liquid to be processed containing minuscule solid particles to one end of at least one filter element open at opposite ends and formed with a multiplicity of tiny openings in a wall including a first surface and a second surface, to allow the liquid to flow along the first surface;

causing a portion of the liquid to flow through the tiny openings in the wall by reducing the pressure on the second surface of the wall of the filter element below the pressure on the first surface thereof, so that filtrate can be drawn off out of the second surface of the wall;

allowing the rest of the liquid to flow out of the filter element through the other end thereof; and controlling the flow velocity F of the liquid flowing along the first surface and/or the flow velocity f of the filtrate flowing through the tiny openings in the wall toward the second surface in such a manner that the ratio F/f can be kept at a predetermined value.

2. A method as claimed in claim 1, wherein said predetermined value is over $5 \times 10^3$.

3. A method as claimed in claim 1, wherein said predetermined value is in the range between $1 \times 10^4$ and $1 \times 10^6$.

4. A method as claimed in one of claims 1-3, wherein said filter element comprises a porous tube filter.

5. A method as claimed in one of claims 1-3, wherein said liquid to be processed is a radioactive waste liquid containing cruds.

6. A method of processing radioactive waste liquid for removing minuscule solid particles, such as cruds, from the waste liquid by passing the waste liquid through a plurality of filter elements each open at opposite ends and formed with a multiplicity of tiny openings in a wall including an inner surface and an outer surface, such method comprising the steps of:

receiving the waste liquid in a liquid recycling tank;

continuously supplying the waste liquid from the liquid recycling tank to one end of each filter element and allowing same to flow along the inner surface of each filter element;

causing a portion of the waste liquid to flow through the tiny openings in the wall by reducing the pressure on the outer surface of each filter element below the pressure on the inner surface thereof, so that filtrate can be continuously drawn off out of the outer surface;

allowing the rest of the waste liquid or a concentrated waste liquid portion to flow out of the other end of each filter element and returning same to the liquid recycling tank; and controlling the flow velocity F of the waste liquid flowing along the inner surface of each filter element and/or the flow rate f of the filtrate flowing through the tiny openings in the wall toward the outer surface in such a manner that the ratio F/f can be kept at a predetermined value.

7. A method as claimed in claim 6, wherein said predetermined value is over $5 \times 10^3$.

8. A method as claimed in claim 6, wherein said predetermined value is in the range between $1 \times 10^4$ and $1 \times 10^{-6}$.

9. A method as claimed in one of claims 6-8, wherein the ratio F/f of the flow velocities is determined by measuring the flow rate of the waste liquid supplied to said one end of each filter element and the flow rate of the filtrate drawn off out of the outer surface of each filter element.

10. A method as claimed in claim 9, wherein the ratio F/f of the flow velocities can be kept at the predetermined value by controlling the flow rate of the filtrate drawn off out of the outer surface of each filter element.

11. A method as claimed in one of claims 6-8, further comprising the steps of detecting an increase in the pressure loss on the walls of the filter elements caused by solid particles trapped in the tiny openings in the walls by measuring the pressure of the filtrate drawn off out of the outer surfaces of the filter elements, and stopping the supply of the waste liquid to one end of each filter element when the pressure loss has reached a level that requires to be corrected while applying high pressure to the filtrate on the side of the outer surfaces of the filter elements to cause same to flow back toward the inner surfaces thereof, to thereby remove the solid particles trapped in the tiny openings therefrom and move same into the interior of each filter element.

12. A method as claimed in claim 11, wherein the filtrate drawn off out of the outer surfaces of the filter elements is temporarily received in a substantially hermetically sealed reverse washing water tank, and caused to flow back toward the inner surfaces of the filter elements by injecting air under high pressure into the reverse washing water tank when the pressure loss has reached the level that requires correcting.

13. A system for removing minuscule solid particles from liquid comprising:

filter means comprising at least one filter element open at opposite ends and formed with a multiplicity of tiny openings in a wall including a first surface and a second surface, and an outer cylindrical member containing the filter element therein and defining an inlet plenum adjacent one end of the filter element, an outlet plenum adjacent the other end of the filter element and an inner plenum adjacent the second surface of the filter element and isolated from the inlet plenum and the outlet plenum;

supply means for supplying the liquid to be processed containing minuscule solid particles to the inlet plenum of the filter means and causing same to flow along the first surface of the filter element;

means for drawing off filtrate from the inner plenum after the filtrate has flowed through the tiny openings in the wall of the filter element into the inner plenum;

means for allowing the rest of the liquid or a concentrated liquid portion to flow out of the outlet plenum; and control means for controlling the flow velocity F of the liquid flowing along the first surface and/or the flow velocity f of the filtrate flowing through the tiny openings in the wall into the inner plenum in such a manner that the ratio F/f can be kept at a predetermined value.

14. A system as claimed in claim 13, wherein said control means keeps the ratio F/f of the flow velocities at a value above $5 \times 10^3$.

15. A system as claimed in claim 13, wherein said control means keeps the ratio F/f of the flow velocities at a predetermined value in the range between $1 \times 10^4$ and $1 \times 10^6$.

16. A system as claimed in one of claims 13–15, wherein said at least one filter element comprises a porous tube filter.

17. A system for processing radioactive waste liquid containing minuscule solid particles, such as cruds, comprising:
a liquid recycling tank for receiving the waste liquid;
filter means including a plurality of filter elements each open at opposite ends and formed with a multiplicity of tiny openings in a wall including an inner surface and an outer surface, and an outer cylindrical member containing the plurality of filter elements therein and defining an inlet plenum adjacent one end of each filter element, an outlet plenum adjacent the other end of each filter element and an inner plenum adjacent the outer surface of each filter element and isolated from the inlet plenum and the outlet plenum;
supply means for continuously supplying the waste liquid from the liquid recycling tank to the inlet plenum of the filter means and causing same to flow along the inner surface of each filter element;
means for continuously drawing off filtrate from the inner plenum after the filtrate has flowed through the tiny openings in the wall of each filter element into the inner plenum;
means for allowing the rest of the waste liquid or a concentrated waste liquid portion to continuously flow out of the outlet plenum; and
control means for controlling the flow velocity F of the waste liquid flowing along the inner surface of each filter element and/or the flow velocity f of the filtrate flowing through the tiny openings in the wall into the inner plenum in such a manner that the ratio F/f can be kept at a predetermined value.

18. A system as claimed in claim 17, wherein said control means is adapted to keep the ratio F/f of the flow velocities at a value above $5 \times 10^3$.

19. A system as claimed in claim 17, wherein said control means is adpated to keep the ratio F/f of the flow velocities at a predetermined value in the range between $1 \times 10^4$ and $1 \times 10^6$.

20. A system as claimed in one of claims 17–19, wherein said control means comprises means for measuring the flow rate of the waste liquid supplied to the inlet plenum of said filter means and generating a corresponding flow rate signal Q, means for measuring the flow rate of the filtrate drawn off from the inner plenum of the filter means and generating a corresponding flow rate signal q, a controller having said predetermined value preset therein for receiving the flow rate signals Q and q, calculating the flow velocites F and f and working out the ratio F/f and comparing the worked out value of the ratio F/f with said predetermined value to generate a control signal when the worked out value does not agree with the predetermined value and deviates from the allowable range, and means receiving said control signal and effecting adjustments of the flow rate of the filtrate drawn off from the inner plenum of the filter means.

21. A system as claimed in one of claims 17–19, further comprising reverse washing means for causing the filtrate drawn off from the inner plenum of the filter means to flow back through the tiny openings in the walls of the filter elements when the rise in the pressure loss of the walls of the filter elements caused by solid particles trapped in the tiny openings exceeds a predetermined value, to thereby remove the trapped solid particles from the tiny openings.

22. A system as claimed in claim 21, wherein said reverse washing means comprises means for measuring the pressure of the filtrate drawn off from the inner plenum of the filter means, means for stopping the supply of the waste liquid to be processed to the inlet plenum, and means for applying high pressure to the filtrate drawn off from the inner plenum to cause the filtrate to flow back through the tiny openings in the walls of the filter elements.

23. A system as claimed in claim 22, wherein said means for applying high pressure comprises a substantially hermetically sealed reverse washing water tank for temporarily receiving the filtrate drawn off from the inner plenum of the filter means, and a high pressure air tank for supplying air under high pressure to said reverse washing water tank to cause the filtrate to flow back through the tiny openings in the walls of the filter elements.

* * * * *